United States Patent
Fang et al.

(10) Patent No.: US 9,537,407 B2
(45) Date of Patent: Jan. 3, 2017

(54) POWER SUPPLY WITH STANDBY OPERATION

(71) Applicant: Cree, Inc., Durham, NC (US)

(72) Inventors: Yuan Fang, Cary, NC (US); Daniel Pope, Morrisville, NC (US); James Andrew McBryde, Raleigh, NC (US)

(73) Assignee: Cree, Inc., Durham, NC (US)

( * ) Notice: Subject to any disclaimer, the term of this patent is extended or adjusted under 35 U.S.C. 154(b) by 799 days.

(21) Appl. No.: 13/900,060

(22) Filed: May 22, 2013

(65) Prior Publication Data

US 2014/0346874 A1    Nov. 27, 2014

(51) Int. Cl.
    *H02M 3/335*       (2006.01)
    *H02M 1/42*        (2007.01)
    *H05B 33/08*       (2006.01)
    *H02M 1/00*        (2006.01)

(52) U.S. Cl.
    CPC ....... *H02M 3/33523* (2013.01); *H02M 1/4258* (2013.01); *H05B 33/0815* (2013.01); *H02M 2001/0032* (2013.01); *Y02B 20/346* (2013.01); *Y02B 70/126* (2013.01); *Y02B 70/16* (2013.01); *Y10T 307/406* (2015.04)

(58) Field of Classification Search
    CPC .......... H02J 3/14; H02J 1/14; H02M 3/33561; H02M 2001/009; H02M 3/33523; H02M 2001/0032; H02M 1/4258; Y02B 70/3225; Y02B 70/16; H05B 33/0815; Y10T 307/406
    USPC .......................................................... 307/31
See application file for complete search history.

(56) References Cited

U.S. PATENT DOCUMENTS

| | | | | |
|---|---|---|---|---|
| 5,353,215 A * | 10/1994 | Dinwiddie | ............. | G05F 1/577 315/411 |
| 6,018,467 A * | 1/2000 | Majid | ............... | H02M 3/33523 363/16 |
| 7,609,008 B1 * | 10/2009 | Kohler | ............... | H05B 33/0893 315/185 R |
| 2010/0188872 A1 * | 7/2010 | Matsumoto | ............. | H02M 1/34 363/21.06 |
| 2011/0051463 A1 * | 3/2011 | Chen | ................. | H02M 3/33507 363/19 |
| 2011/0103104 A1 * | 5/2011 | Zhan | ................. | H02M 3/33507 363/21.17 |
| 2012/0257421 A1 * | 10/2012 | Brkovic | ................. | H01F 27/38 363/21.07 |
| 2014/0232366 A1 * | 8/2014 | Lawson | .................... | H02J 3/32 323/282 |
| 2014/0265582 A1 * | 9/2014 | Hyypio | ................... | H02M 1/10 307/52 |

* cited by examiner

*Primary Examiner* — Jung Kim
*Assistant Examiner* — Brian K Baxter
(74) *Attorney, Agent, or Firm* — Myers Bigel, P.A.

(57) ABSTRACT

A power supply includes a power conversion circuit configured to selectively operate in one of an active mode in which output power is supplied to a load and a standby mode in which output power is not supplied to the load, a plurality of auxiliary circuits including a first auxiliary circuit and a second auxiliary circuit, a bias node configured to supply power to the plurality of auxiliary circuits, and a switch that is coupled between the bias node and the first auxiliary circuit and that is configured to disconnect the first auxiliary circuit from the bias node in response to a control signal.

23 Claims, 5 Drawing Sheets

POWER SUPPLY WITH STANDBY OPERATION

FIELD

The present inventive concept relates to driver circuits for solid state lighting apparatus.

BACKGROUND

Solid-state lighting arrays are used for a number of lighting applications. For example, solid-state lighting panels including arrays of solid-state light emitting devices have been used as direct illumination sources, for example, in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Typically, a solid-state light emitting device generates light through the recombination of electronic carriers, i.e. electrons and holes, in a light emitting layer or region. A solid-state light emitting device may include, for example, a packaged light emitting device including one or more light emitting diodes (LEDs).

Cree, Inc. produces a variety of products that use LEDs for illumination, such as recessed downlights, troffers and lamps. Solid-state lighting panels are also commonly used as backlights for small liquid crystal display (LCD) screens, such as LCD display screens used in portable electronic devices, and for larger displays, such as LCD television displays.

Solid state lighting devices are typically powered with a constant current signal. However, power is conventionally delivered in AC form. It is therefore generally desirable for a solid state lighting fixture to include an AC/DC converter to convert AC line voltage to a constant current.

Voltage converters can be used to generate DC voltage and/or current from an AC line voltage with high power factor and low total harmonic distortion.

In addition to the high voltage signal needed to power the LEDs, solid state lighting systems also need to generate a low voltage DC signal to power auxiliary circuits, such as a microcontroller, communication systems, ambient light sensors, occupancy (motion detection) sensors, gate drivers, etc. It is typically desirable for many of these auxiliary circuits to remain operational even when the light of the solid state lighting system is turned off. For example, in some cases, it is desirable for the solid state lighting system to be capable of being turned on/off or adjusting the amount of light output in response to a wireless communication signal or in response to an occupancy signal indicating that someone has entered (or left) the room in which the solid state lighting system is installed. Accordingly, instead of completely turning off, the solid state lighting system may instead enter a standby mode in which the light is off but some of the auxiliary circuits remain on.

In general, it is desirable to reduce standby power consumption of solid state lighting systems. The goal of reducing standby power consumption has been recognized by regulatory agencies throughout the world. For example, in Europe, the United States and Canada, energy efficiency standards have been introduced that will require reduction of standby power consumption. Future solid state lighting products may be expected to consume less than 1 W, and in some cases less than 0.5 W of standby power.

SUMMARY

A power supply according to some embodiments includes a power conversion circuit configured to selectively operate in one of an active mode in which output power is supplied to a load and a standby mode in which output power is not supplied to the load, a plurality of auxiliary circuits including a first auxiliary circuit and a second auxiliary circuit, a bias node configured to supply power to the plurality of auxiliary circuits, and a switch that is coupled between the bias node and the first auxiliary circuit and that is configured to disconnect the first auxiliary circuit from the bias node in response to a control signal.

The first auxiliary circuit may be configured to operate during the active mode only, and the second auxiliary circuit may be configured to operate in both the active mode and the standby mode.

The power supply may further include a controller configured to generate the control signal in response to the power supply being placed in the standby mode. The second auxiliary circuit may include the controller.

The power conversion circuit may include a two stage AC-DC driver circuit including a primary stage that receives input power and a secondary stage that is isolated from the primary stage and that delivers output power to the load. The bias node may include a secondary stage bias node, and the plurality of auxiliary circuits may be in the secondary stage.

The primary stage may include a flyback stage. The secondary stage may include a buck stage, and the primary stage and the secondary stage may be isolated from one another by a flyback transformer. The flyback transformer may include a primary side main winding coupled to an input power source, a secondary side main winding coupled to the load, a primary side bias winding coupled by mutual inductance to the primary side main winding and a secondary side bias winding coupled by mutual inductance to the primary side main winding.

The power supply may further include a first diode coupled to the secondary stage main winding, a linear regulator coupled to the first diode, a second diode coupled to the linear regulator and to the secondary stage bias node, and a third diode coupled to the secondary side bias winding and to the secondary stage bias node.

The power supply may further include a primary side bias node coupled to the primary side bias winding, a supplemental primary side bias winding coupled by mutual inductance to the primary side bias winding, and a second switch coupled between the supplemental primary side bias winding and the primary side bias node. The switch may be configured to connect the supplemental primary side bias winding to the primary side bias node in response to a second control signal.

The power supply may further include a controller configured to generate the first control signal and the second control signal in response to the power supply being placed in the standby mode.

The power supply may further include a flyback circuit coupled to the primary side bias node.

A method is provided of operating a power supply including a power conversion circuit and a plurality of auxiliary circuits and that is configured to selectively operate in one of an active mode in which output power is supplied to a load and a standby mode in which output power is not supplied to the load. The method may include disabling a first one of the plurality of auxiliary circuits that functions only during the active mode in response to operating the power supply in the standby mode while enabling a second one of the plurality of auxiliary circuits, and enabling the first one of the plurality of auxiliary circuits in response to operating the power supply in the active mode.

Disabling the first one of the plurality of auxiliary circuits may include disconnecting the first one of the plurality of auxiliary circuits from a bias node, and wherein enabling the first one of the plurality of auxiliary circuits may include connecting the first one of the plurality of auxiliary circuits to the bias node.

The power supply may include a two stage AC-DC driver circuit including a primary stage that receives input power and a secondary stage that is isolated from the primary stage and that generates a secondary side bus voltage, and the plurality of auxiliary circuits may be in the secondary stage. The method may further include reducing the secondary side bus voltage while the power supply is in the standby mode.

The primary stage may include a power factor correcting voltage conversion circuit, and the method may include controlling the secondary side bus voltage so that the power factor correction voltage conversion circuit operates in a burst mode while the power supply is in the standby mode.

The primary stage and the secondary stage may be isolated from one another by a flyback transformer including a primary side main winding coupled to an input power source, a secondary side main winding coupled to the load, a primary side bias winding coupled by mutual inductance to the primary side main winding, a secondary side bias winding coupled by mutual inductance to the primary side main winding, and a supplemental primary side bias winding coupled by mutual inductance to the primary side bias winding. A primary side bias node may be coupled to the primary side bias winding. The method may further include connecting the supplemental primary side bias winding to the primary side bias node when the power supply is in the standby mode.

A power supply according to further embodiments includes a power conversion circuit configured to selectively operate in one of an active mode in which output power is supplied to a load and a standby mode in which output power is not supplied to the load. The power conversion circuit includes a two stage AC-DC driver circuit including a primary stage that receives input power and a secondary stage that is isolated from the primary stage and that delivers output power to the load, and a flyback transformer between the primary stage and the secondary stage. The flyback transformer includes a primary side main winding coupled to an input power source, a secondary side main winding coupled to the load, a primary side bias winding coupled by mutual inductance to the primary side main winding, a secondary side bias winding coupled by mutual inductance to the primary side main winding, and a supplemental primary side bias winding coupled by mutual inductance to the primary side bias winding. A primary side bias node may be coupled to the primary side bias winding, and a switch may be coupled between the supplemental primary side bias winding and the primary side bias node. The switch may be configured to connect the supplemental primary side bias winding to the primary side bias node when the power conversion circuit is operated in the standby mode.

The switch may be controlled by a control signal generated by a controller configured in response to the power supply being placed in the standby mode.

The control signal may include a first control signal, and the power supply may further include a plurality of auxiliary circuits including a first auxiliary circuit and a second auxiliary circuit, a bias node configured to supply power to the plurality of auxiliary circuits, and a second switch that is coupled between the bias node and the first auxiliary circuit and that is configured to disconnect the first auxiliary circuit from the bias node in response to a second control signal.

The first auxiliary circuit may be configured to operate during the active mode only, and the second auxiliary circuit may be configured to operate in both the active mode and the standby mode.

The controller may be configured to generate the second control signal in response to the power supply being placed in the standby mode.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION OF EMBODIMENTS

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The power supply of a solid state lighting system is typically designed to provide power to high brightness LEDs in an efficient manner. A power supply designed to efficiently drive a high voltage, high current load, such as an array of high brightness LEDs, may not be able to efficiently provide a low voltage, low power bias signal that is needed to power the auxiliary circuits that remain on when the solid state lighting system is in standby mode.

Figure 1A:
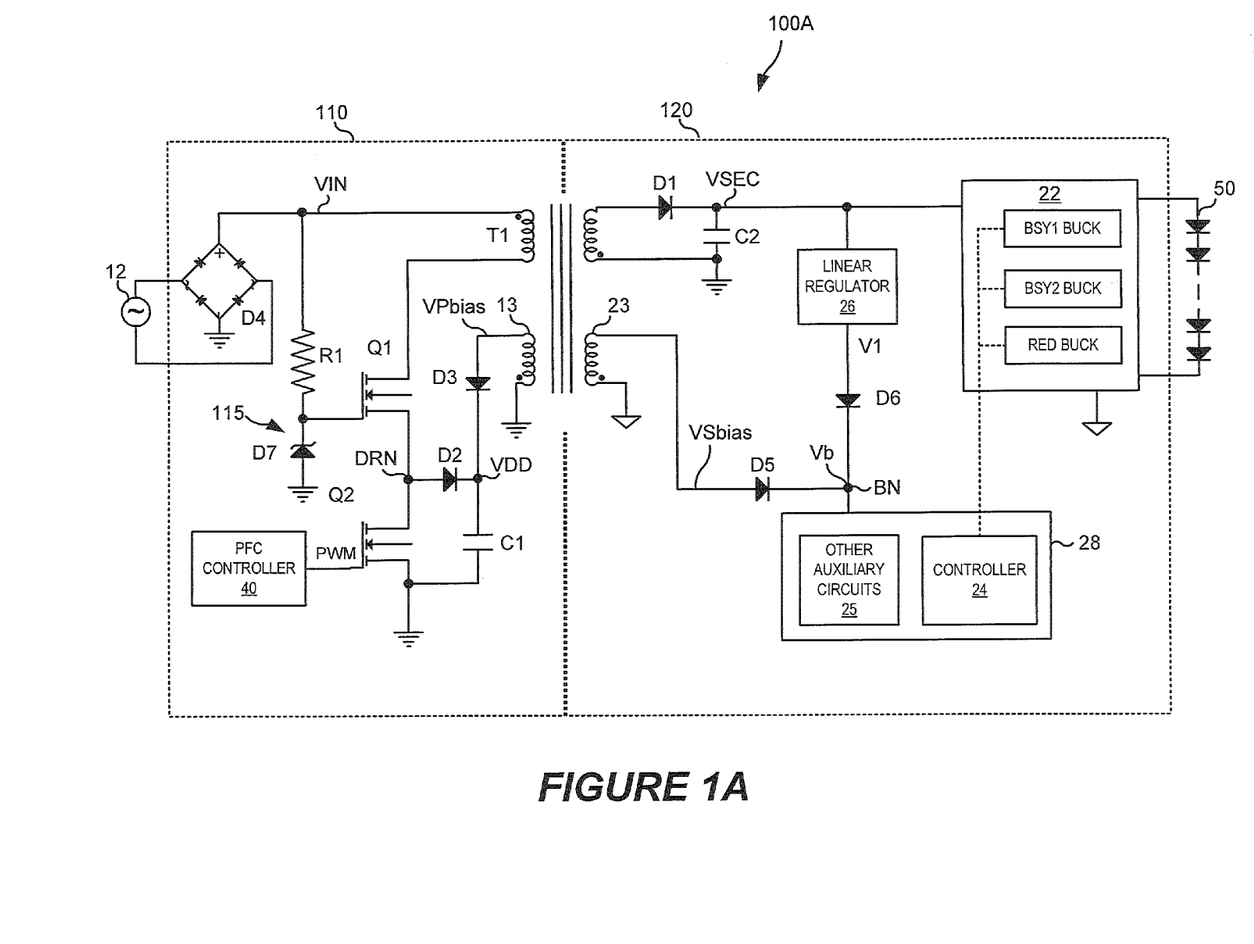
FIG. 1A is a circuit diagram of a power supply circuit.

FIG. 1A illustrates a two-stage AC-DC LED driver circuit 100A. The AC-DC LED driver circuit 100A receives AC input from an power source 12, which may be an AC line voltage, and generates an output DC voltage and current for driving a load 50, which may include one or more strings or arrays of LEDs. The AC-DC LED driver circuit 100A includes an isolated front-end flyback stage 110 and a back-end buck stage 120 that is isolated from the front-end stage by a flyback transformer T1.

The front-end flyback stage 110 includes a full wave bridge rectifier D4 and a flyback circuit 115. The front-end flyback stage 110 operates in transition mode to convert the line voltage VIN to a bus voltage VSEC that is used to drive the LED load 50. The back-end buck stage 120 regulates the output LED current. In particular, the back-end buck stage 120 includes a buck controller module 22 that includes a plurality of buck converters that control current supplied to respective strings of LEDs (e.g., strings of BSY, or blue shifted yellow, LEDs, red LEDs, etc.) in the load 50. It will be appreciated that the back-end stage could include other types of converters, such as boost converters, buck-boost converters, etc. Furthermore, a single converter may be used instead of multiple converters as shown in FIG. 1A.

The flyback circuit 115 includes a resistor R1, a flyback switch including a high voltage switch Q1 and a low voltage switch Q2, a capacitor C1 and diodes D2 and D3, and Zener diode D7. The high voltage switch Q1 and low voltage switch Q2 may be field effect transistor (FET) devices as shown in FIG. 1, or may be implemented using other types of transistors.

The flyback switch, including the high voltage switch Q1 and the low voltage switch Q2, may have a cascode configuration. In this configuration, high voltage FET Q1 is saved for the startup circuitry. The conductivity of the high voltage switch Q1 is modulated by the voltage at the source terminal of the switch Q1, which is controlled by the low voltage switch Q2.

The turn-ON period of the low voltage switch Q2 is modulated by a PWM signal generated by a power factor correction (PFC) controller 40.

The rectified line voltage VIN is supplied to the primary winding of a flyback transformer T1. The secondary winding of the flyback transformer T1 is coupled to a diode D1 which serves as an output rectifier. The diode D1 is coupled to an output capacitor C2, which maintains the bus voltage VSEC on the back-end buck stage 120 (secondary side) of the circuit 100A.

The bus voltage VSEC generated in the back-end buck stage 120 serves as an input for the LED load 50 and for a linear regulator 26.

The linear regulator 26 provides a supply voltage V1 to a rectifying diode D6 that is coupled to a bias node BN.

A primary side bias winding 13 having N1 turns and a secondary side bias winding 23 are coupled to the flyback transformer T1. The secondary side bias winding 23 provides a voltage VSbias to a rectifying diode D5 that is also coupled to the bias node BN.

The higher of V1 and VSbias provides a bias voltage Vb at the bias node BN for powering auxiliary circuits 28 of the solid state lighting apparatus, including auxiliary circuits that are required to remain active during standby-mode operation. The auxiliary circuits 28 include a controller 24 and other auxiliary circuits 25 (communication, motion detection sensor, ambient light sensor, etc.)

During active-mode operation, the primary side bias winding 13 generates a voltage VDD when the voltage VPbias induced on the primary side bias winding 13 is higher than the voltage DRN on the drain of the low voltage switch Q2. The voltage VDD is used to power the control circuitry in the front-end flyback stage 110 of the circuit 100A.

Also during active mode operation, the secondary side bias winding 23 provides charging current into the auxiliary circuits (including the controller 24) when the voltage VSbias is higher than the voltage V1 output by the linear regulator 26.

During standby mode operation, there is a light load or no load on the circuit 100A. In that case, the primary side bias winding 13 may not provide enough energy to supply the VDD voltage, because of the very small duty cycle of the control signal PWM supplied to the low voltage switch Q2, or burst mode operation of the flyback stage 110, under light loads. This causes the main switch Q1 to operate in a linear mode. Because VIN remains high, however, a large amount of power will be dissipated in the high voltage switch Q1, leading to high power losses.

Meanwhile, the auxiliary circuits that need to operate in active mode only will continue to draw current. Moreover, the voltage drop ("headroom") across the linear regulator 26 remains high and consumes more power, because the voltage VSbias generated by the secondary side bias winding 23 drops significantly when the driver operates in light/no load conditions and thus cannot surpass the output V1 of the linear regulator 26.

All of these factors may contribute to high power losses during standby mode operation.

Figure 1B:
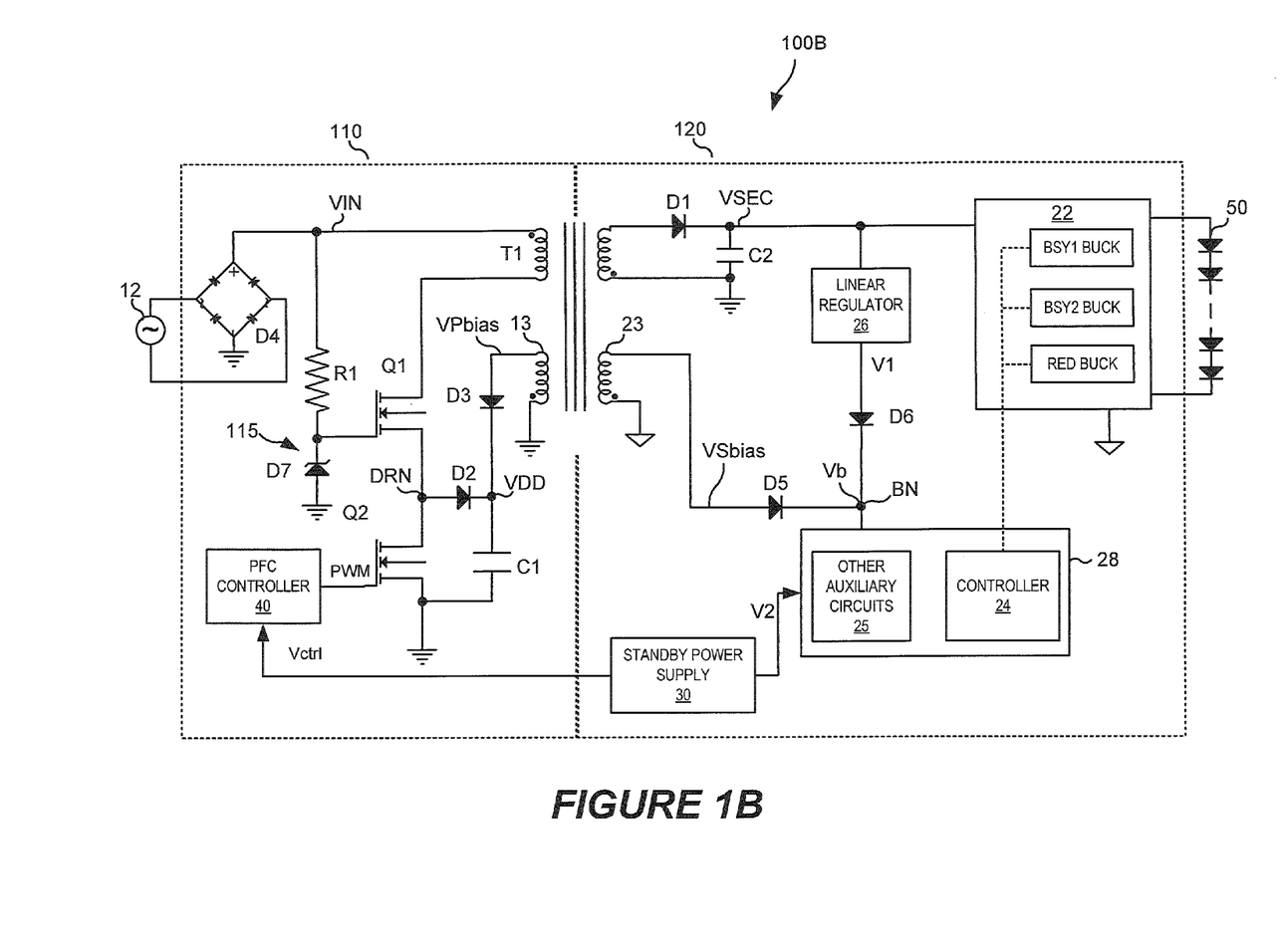
FIG. 1B is a circuit diagram of a power supply circuit including a standby power supply.

A typical solution to this problem, illustrated in FIG. 1B, is to provide a separate standby power supply for the solid state lighting system that is configured to provide bias power to functional portions of the solid state lighting system that remain on while the solid state lighting system is in standby mode.

Referring to FIG. 1B, a dedicated standby power supply 30, such as an isolated AC-DC switched mode power supply, may be provided. The standby power supply 30 may provide enough supply voltage V2 to power the auxiliary circuits 28, while the PFC controller 40 is shut off through a control signal Vctrl.

Providing a separate dedicated standby power supply undesirably increases the cost of the lighting system, in addition to consuming valuable space on the power supply printed circuit board.

Some embodiments of the present inventive concepts address the low standby power requirement by modifying the power supply to significantly reduce the power dissipation during standby mode operation and eliminating the need for a dedicated standby power supply. Some embodiments may operate with a simple control scheme and may be implemented at low cost compared to the use of a dedicated standby power supply.

According to some embodiments, the auxiliary circuits required only during active mode operation are identified. These auxiliary circuits are disabled during standby mode. The voltage drop over the linear regulator is reduced, while keeping enough supply voltage to wake up the functions, such as communication, sensor, main controller, microcontroller, etc., that are needed during standby mode. Further, the bus voltage is adjusted to enable the main power factor correction controller to operate in the burst mode during standby mode. The bus voltage depends on the flyback transformer turns ratio, standby mode load, burst mode switching frequency, primary-side VDD bias capacitor and resistor.

In some embodiments, more turns may be switched into the primary-side bias winding of flyback transformer so as to increase the primary side bias voltage VPbias generated by the flyback transformer. The increase of the VPbias voltage may push the high voltage switch Q1 out of linear mode during standby mode.

A power supply according to some embodiments may consume less than 1 W, and in some embodiments less than 0.5 W, during standby mode while generating a supply voltage that is sufficient to wake up the system. This allows the LED driver itself to meet increasingly stringent standby power requirements without the necessity of providing a separate standby power supply.

Figure 2:
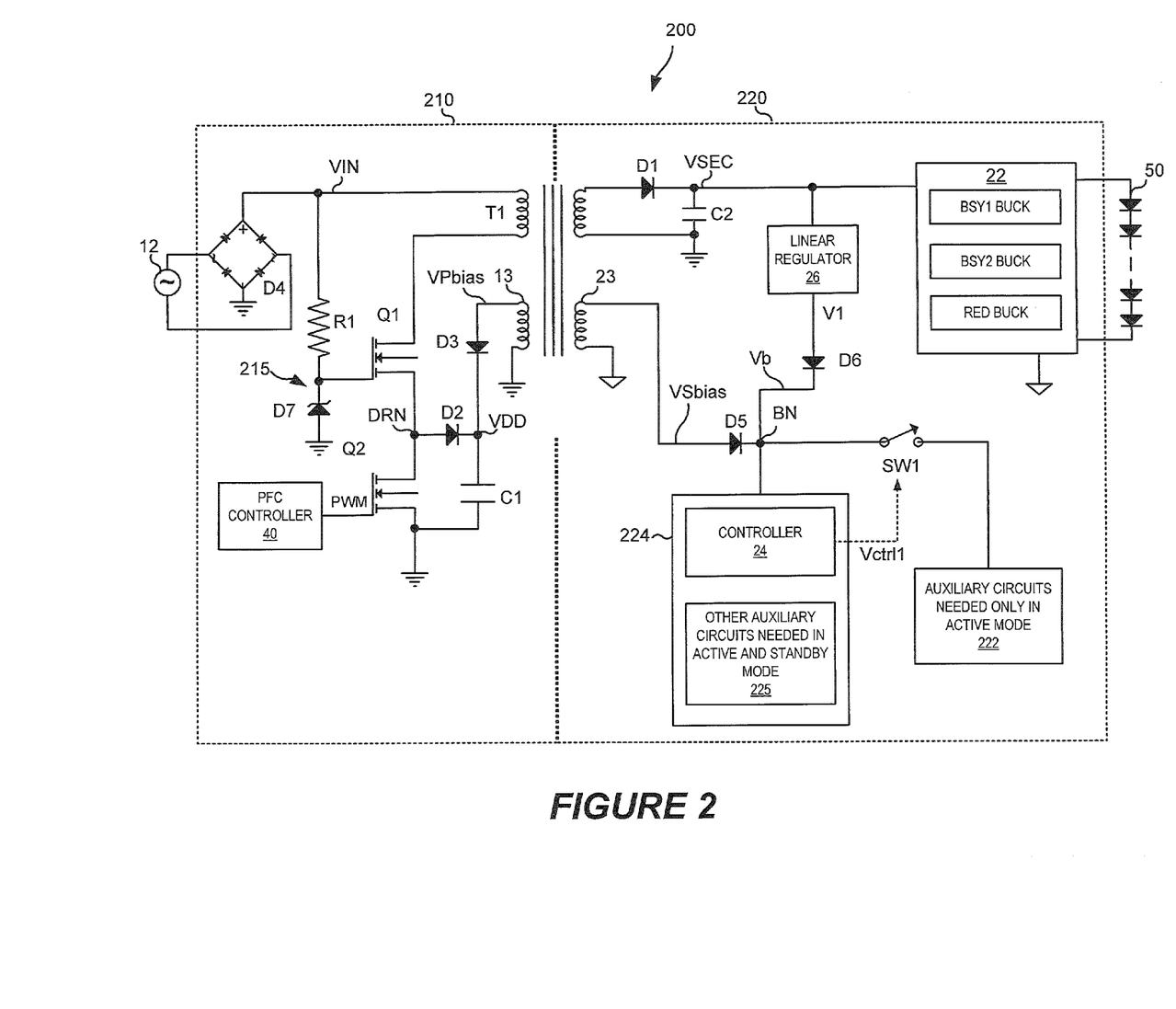
FIG. 2 is a circuit diagram of a power supply circuit according to some embodiments.

FIG. 2 illustrates a two-stage AC-DC LED driver circuit 200 according to some embodiments. The AC-DC LED driver circuit 200 receives power from an AC source 12, which may be an AC line voltage, and generates an output voltage and current for driving a load 50, which may include one or more strings or arrays of LEDs. The AC-DC LED driver circuit 200 includes a front-end flyback stage 210 and a back-end buck stage 220.

The front-end flyback stage 210 includes a full wave bridge rectifier D4 and a flyback circuit 215. The front-end flyback stage 210 operates in transition mode to convert the line voltage VIN to a bus voltage VSEC that is used to drive the LED load 50. The back-end buck stage 220 regulates the output LED current. In particular, the back-end buck stage 220 includes a buck converter module 22 that includes a plurality of buck converters that regulate current supplied to respective strings of LEDs in the load 50. As noted above, other types of converters, such as boost, buck-boost, single ended primary inductor converters, etc., may be provided. Moreover, a single converter may be used instead of multiple converters as shown in FIG. 2.

The flyback circuit 215 includes a resistor R1, a flyback switch including a high voltage switch Q1 and a low voltage switch Q2, a capacitor C1 and diodes D2 and D3, and Zener diode D7. The high voltage switch 01 and the low voltage switch Q2 may be field effect transistor (FET) devices as shown in FIG. 2, or may be implemented using other types of transistors.

The flyback switch, including the high voltage switch Q1 and the low voltage switch Q2, may have a cascode configuration. In this configuration, the high voltage switch Q1 is saved for the startup circuitry. The conductivity of the high voltage switch Q1 is modulated by the voltage at the source terminal of the switch Q1, which is controlled by the low voltage switch Q2.

The turn-ON period of the low voltage switch Q2 is modulated by a PWM signal generated by a power factor correction (PFC) controller 40.

The rectified line voltage VIN is supplied to the primary winding of a flyback transformer T1. The secondary winding of the flyback transformer T1 is coupled to a diode D1 which serves as an output rectifier. The diode D1 is coupled to an output capacitor C2, which supplies the bus voltage VSEC on the back-end buck stage 220 (secondary side) of the circuit 200.

The bus voltage VSEC generated in the back-end buck stage 220 serves as an input for the LED load 50 and for a linear regulator 26. The linear regulator 26 provides a supply voltage V1 to a rectifying diode D6 that is coupled to a bias node BN.

A primary side bias winding 13 and a secondary side bias winding 23 are coupled to the flyback transformer T1. The secondary side bias winding 23 provides a voltage VSbias to a rectifying diode D5 that is also coupled to the bias node BN.

In the two-stage AC-DC LED driver circuit 200 shown in FIG. 2, the auxiliary circuits are separated into auxiliary circuits 222 that are only needed during active mode operation, such as the gate driver, the synchronized rectifier, etc., and auxiliary circuits 224 that are needed during both active mode and standby mode operation, including the controller 24, and other auxiliary circuits 225 needed in standby mode and active mode operation, such as ambient light sensors, occupancy sensors, communication modules, etc.

The back-end buck stage 220 includes a switch SW1 between the bias node BN and the auxiliary circuits 222 that are only needed during active mode operation. The switch S1 is controlled by a control signal Vctrl1 that is generated by the controller 24 when the apparatus is placed in standby mode.

In response to the control signal Vctrl1, the switch SW1 cuts off the bias current to the auxiliary circuits 222 that are only needed during active mode operation. When the total bias current is reduced, less power is consumed by the circuit.

When the apparatus is placed into standby mode, the PFC controller 40 decreases the bus voltage VSEC, for example by adjusting an internal reference voltage. This has the effect of lowering the headroom voltage (VSEC-Vb) across the linear regulator 26. When the headroom voltage across the linear regulator 26 is reduced, it may consume less power.

Finally, the bus voltage VSEC is controlled so that the PFC controller operates in burst mode. The value of VSEC varies with the flyback transformer turns ratio, transformer construction and coupling between windings, standby-mode loading, and main controller burst mode switching frequency.

Operating the two-stage AC-DC LED driver circuit 200 under these conditions may result in a significant reduction in the amount of standby power consumed. The active mode and standby mode power consumption of a two-stage AC-DC LED driver circuit as shown in FIG. 2 was measured and compared to the active mode and standby mode power consumption of a two-stage AC-DC LED driver circuit without the modifications described above. The results are summarized in Table I. As shown therein, for 120V operation with VSEC set at 25V, the standby mode input power decreased from 3.633 W to 0.725 W, For 277V operation with VSEC set at 25V, the standby mode input power decreased from 3.775 W to 0.818 W.

TABLE I

| Measurement results | | |
| --- | --- | --- |
| Input Voltage | 120 V | 277 V |
| Active-mode input power | 43.78 W | 43.65 W |
| Standby input power without modifications | 3.633 W | 3.775 W |
| Standby input power with modifications | 0.725 W | 0.818 W |

Increasing VSEC to 28V may result in further reduction of power consumption, and may in some cases result in power consumption less than 0.5 W during standby mode.

Figure 3:
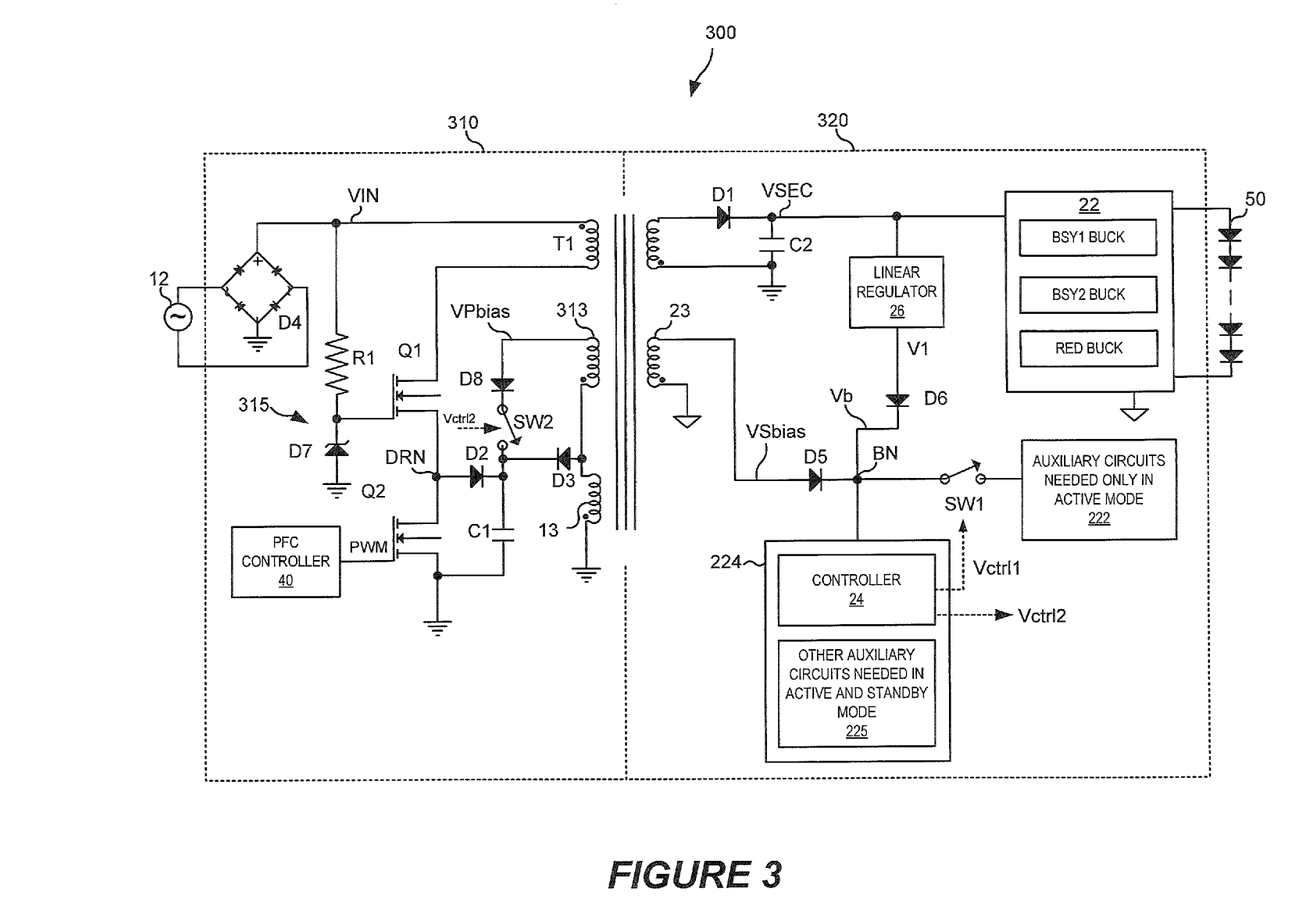
FIG. 3 is a circuit diagram of a power supply circuit according to further embodiments.

FIG. 3 illustrates a two-stage AC-DC LED driver circuit 300 according to further embodiments. The two stage AC-DC LED driver circuit 300 includes a front-end flyback stage 310 and a back-end buck stage 320.

The back-end buck stage 320 is similar to the back-end buck stage 220 of the two-stage AC-DC LED driver circuit 200 of FIG. 2. The front-end flyback stage 310 is similar to the front-end flyback stage 210 of the two-stage AC-DC LED driver circuit 200 shown in FIG. 2, except that the front-end flyback stage 310 includes a second switch SW2 and a diode D8 that switch a supplemental primary-side bias winding 313 having N2 turns into the primary-side bias winding 13 of the flyback transformer T1 in response to a control signal Vctrl2 generated by the controller 24.

In particular, when the apparatus enters standby mode, the controller 24 causes the SW2 to switch more turns (N1+N2) onto the primary-side bias winding of flyback transformer T1. This increases the voltage VPbias, which pushes the high voltage switch Q1 out of linear mode, further reducing power consumption of the circuit in standby mode.

In some embodiments, when the apparatus enters standby mode, the controller 24 the controller may disable functions of the controller itself that are not needed in standby mode. This may allow the controller 24 to draw less power even when it is operated in standby mode. Functions that may be disabled by the controller 24 during standby mode may include, for example, a timer within the controller 24 may be disabled. In addition, the clock of the controller may be slowed down.

Although illustrated in the context of a solid state lighting apparatus, it will be appreciated that embodiments of the invention can be used in other applications, such as in computing devices, communication device, consumer electronics, etc.

Figure 4:
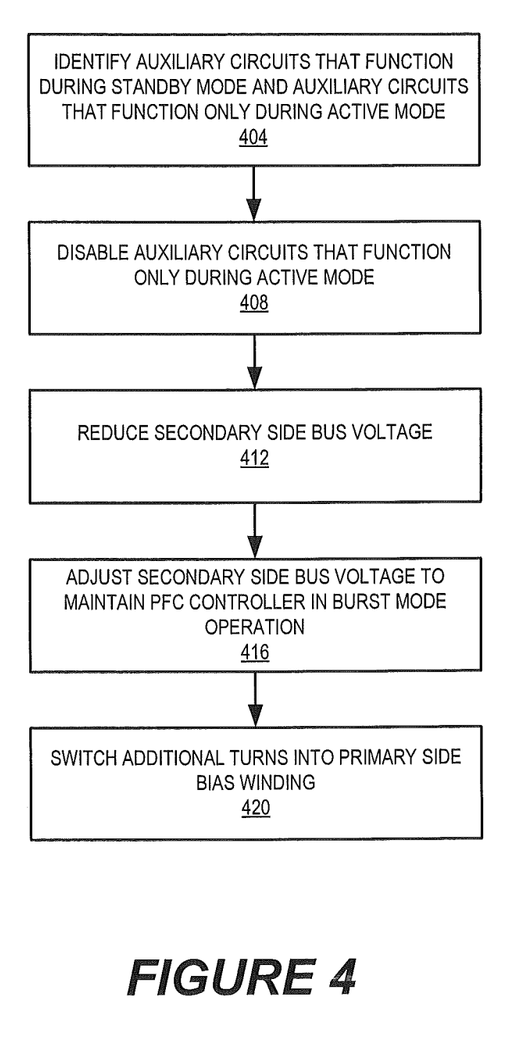
FIG. 4 is a flowchart of operations of a power supply circuit according to embodiments of the inventive concepts.

Operations according to some embodiments for operating a power supply are illustrated in FIG. 4. As shown therein, some embodiments may identify one or more auxiliary circuits of a power supply that function during standby mode and one or more auxiliary circuits that function only during active mode (block 404). Circuits that function only during active mode may be disabled when the power supply is operated in the standby mode (block 408). Disabling these circuits may reduce the amount of bias current consumed while the power supply is operated in standby mode.

In addition to or instead of disabling unneeded auxiliary circuits, a secondary side bus voltage of the power supply may be reduced (block 412). As noted above, this may reduce a voltage drop over a linear regulator on the secondary side of the power supply. Further, the secondary side bus voltage may be adjusted to ensure that a power factor correction (PFC) controller in the power supply continues to operate in burst mode even when the power supply is in standby mode (block 416). Finally, additional turns may be switched into a primary side bias winding to keep a switch in the primary side of the power supply out of linear mode, which may further reduce power consumption of the circuit in standby mode (block 420).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A power supply, comprising:
a power conversion circuit configured to selectively operate in one of an active mode in which output power is supplied to a load through an output voltage at an output voltage node and a standby mode in which output power is not supplied to the load;

a plurality of auxiliary circuits including a first auxiliary circuit and a second auxiliary circuit;

a bias node that is separate from the output voltage node and that is configured to supply a bias voltage to the first auxiliary circuit and the second auxiliary circuit; and a switch that is coupled between the bias node and the first auxiliary circuit and that is configured to disconnect the first auxiliary circuit from the bias node in response to a control signal when the power conversion circuit is operated in the standby mode.

2. The power supply of claim 1, wherein the first auxiliary circuit is configured to operate during the active mode only, and wherein the second auxiliary circuit is configured to operate in both the active mode and the standby mode.

3. The power supply of claim 2, further comprising a controller configured to generate the control signal in response to the power supply being placed in the standby mode.

4. The power supply of claim 3, wherein the second auxiliary circuit comprises the controller.

5. The power supply of claim 1, wherein the power conversion circuit comprises a two stage AC-DC driver circuit including a primary stage that receives input power and a secondary stage that is isolated from the primary stage and that delivers output power to the load, wherein the bias node comprises a secondary stage bias node, and wherein the plurality of auxiliary circuits are in the secondary stage.

6. The power supply of claim 5, wherein the primary stage comprises a flyback stage, the secondary stage comprises a buck stage, and the primary stage and the secondary stage are isolated from one another by a flyback transformer including a primary side main winding coupled to an input power source, a secondary side main winding coupled to the load, a primary side bias winding coupled by mutual inductance to the primary side main winding and a secondary side bias winding coupled by mutual inductance to the primary side main winding.

7. The power supply of claim 6, further comprising a first diode coupled to the secondary stage main winding, a linear regulator coupled to the first diode, a second diode coupled to the linear regulator and to the secondary stage bias node, and a third diode coupled to the secondary side bias winding and to the secondary stage bias node.

8. The power supply of claim 6, further comprising a primary side bias node coupled to the primary side bias winding, a supplemental primary side bias winding coupled by mutual inductance to the primary side bias winding, and a second switch coupled between the supplemental primary side bias winding and the primary side bias node, wherein the switch is configured to connect the supplemental primary side bias winding to the primary side bias node in response to a second control signal.

9. The power supply of claim 8, further comprising a controller configured to generate the first control signal and the second control signal in response to the power supply being placed in the standby mode.

10. The power supply of claim 9, further comprising a flyback circuit coupled to the primary side bias node.

11. A method of operating a power supply including a power conversion circuit and a plurality of auxiliary circuits and that is configured to selectively operate in one of an active mode in which output power is supplied to a load through an output voltage at an output voltage node and a standby mode in which output power is not supplied to the load, the method comprising:

disconnecting a bias node that is separate from the output voltage node and that supplies a bias voltage from a first one of the plurality of auxiliary circuits that functions only during the active mode in response to operating the power supply in the standby mode while supplying the bias voltage from the bias node to a second one of the plurality of auxiliary circuits; and supplying the bias voltage from the bias node to the first one of the plurality of auxiliary circuits in response to operating the power supply in the active mode.

12. The method of claim 11, wherein disabling the first one of the plurality of auxiliary circuits comprises disconnecting the first one of the plurality of auxiliary circuits from a bias node, and wherein enabling the first one of the plurality of auxiliary circuits comprises connecting the first one of the plurality of auxiliary circuits to the bias node.

13. The method of claim 11, wherein the power supply comprises a two stage AC-DC driver circuit including a primary stage that receives input power and a secondary stage that is isolated from the primary stage and that generates a secondary side bus voltage, and wherein the plurality of auxiliary circuits are in the secondary stage, the method further comprising:

reducing the secondary side bus voltage while the power supply is in the standby mode.

14. The method of claim 13, wherein the primary stage comprises a power factor correcting voltage conversion circuit, the method further comprising:

controlling the secondary side bus voltage so that the power factor correction voltage conversion circuit operates in a burst mode while the power supply is in the standby mode.

15. The method of claim 13, wherein the primary stage and the secondary stage are isolated from one another by a flyback transformer including a primary side main winding coupled to an input power source, a secondary side main winding coupled to the load, a primary side bias winding coupled by mutual inductance to the primary side main winding, a secondary side bias winding coupled by mutual inductance to the primary side main winding, and a supplemental primary side bias winding coupled by mutual inductance to the primary side bias winding, and a primary side bias node coupled to the primary side bias winding, the method comprising:

connecting the supplemental primary side bias winding to the primary side bias node when the power supply is in the standby mode.

16. A power supply, comprising:

a power conversion circuit configured to selectively operate in one of an active mode in which output power is supplied to a load and a standby mode in which output power is not supplied to the load, the power conversion circuit comprising a two stage AC-DC driver circuit including a primary stage that receives input power and a secondary stage that is isolated from the primary stage and that delivers output power to the load;

a flyback transformer between the primary stage and the secondary stage, the flyback transformer including a primary side main winding coupled to an input power source, a secondary side main winding coupled to the load, a primary side bias winding coupled by mutual inductance to the primary side main winding, a secondary side bias winding coupled by mutual inductance to the primary side main winding, and a supplemental primary side bias winding coupled by mutual inductance to the primary side bias winding;

a primary side bias node coupled to the primary side bias winding; and a switch coupled between the supplemental primary side bias winding and the primary side bias node, wherein the switch is configured to connect the supplemental primary side bias winding to the primary side bias node when the power conversion circuit is operated in the standby mode.

17. The power supply of claim 16, further comprising:

a switch between the primary side bias node and the supplemental primary side bias winding, wherein the switch is controlled by a control signal; and a controller configured to generate the control signal in response to the power supply being placed in the standby mode.

18. The power supply of claim 17, wherein the control signal comprises a first control signal, the power supply further comprising:

a plurality of auxiliary circuits including a first auxiliary circuit and a second auxiliary circuit;

a bias node configured to supply power to the plurality of auxiliary circuits; and a second switch that is coupled between the bias node and the first auxiliary circuit and that is configured to disconnect the first auxiliary circuit from the bias node in response to a second control signal.

19. The power supply of claim 18, wherein the first auxiliary circuit is configured to operate during the active mode only, and wherein the second auxiliary circuit is configured to operate in both the active mode and the standby mode.

20. The power supply of claim 18, wherein the controller is configured to generate the second control signal in response to the power supply being placed in the standby mode.

21. The power supply of claim 18, wherein the controller comprises a microcontroller.

22. The power supply of claim 18, wherein an amount of bias current consumed by the power supply is reduced when the first auxiliary circuit is disconnected from the bias node.

23. The power supply of claim 17, wherein the controller is configured to disable an internal function of the controller during the standby mode.

* * * * *